(No Model.)
J. F. McELROY.
GAS LAMP.
No. 571,311.  Patented Nov. 10, 1896.
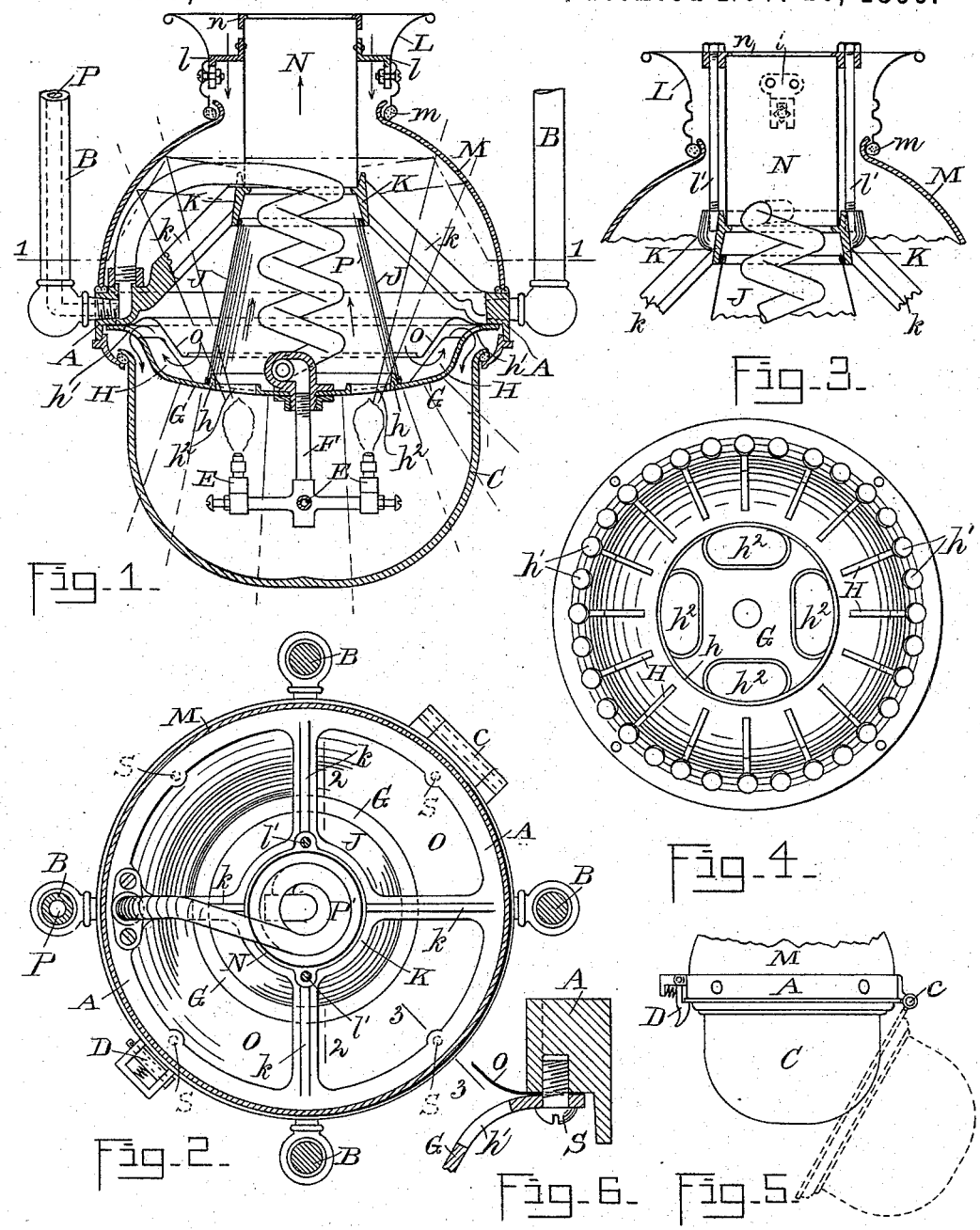
Witnesses:
John W. Fisher
Grace T. Many
Inventor:
James F. McElroy
by Waid & Cameron
Attorneys

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

GAS-LAMP.

SPECIFICATION forming part of Letters Patent No. 571,311, dated November 10, 1896.

Application filed November 19, 1894. Serial No. 529,267. (No model.)

*To all whom it may concern:*

Be it known that I, JAMES F. MCELROY, a citizen of the United States, residing at the city and county of Albany, State of New York, have invented a new and useful Improvement in Gas-Lamps, of which the following is a specification.

My invention relates to improvements in lamps and lanterns particularly adapted for use in railway-cars; and the object of my invention is to produce a lamp in which the air and the gas used in combustion shall be heated by the operation of the lamp and so constructed as to obtain the greatest amount of illuminating power. I attain this object by means of the mechanism illustrated in the accompanying drawings, in which—

Figure 1 is a vertical section. Fig. 2 is a cross-section along the line 1 1 on Fig. 1. Fig. 3 is a section along the line 2 2 on Fig. 2. Fig. 4 is a plan of the reflector. Fig. 5 is an elevation showing the method of opening and closing the lower globe, and Fig. 6 is a detail section along the line 3 3 on Fig. 2.

Similar letters refer to similar parts throughout the several views.

A represents the lamp-ring, secured by means of the rods B to the roof of the car.

C represents the lower globe, hinged at c and provided with a spring-catch D for holding the globe in position when closed.

Within the globe C, I arrange the burners E, secured to the gas-pipe F. Above the burners and attached to the ring A, I arrange the reflector G, the lower surface of the reflector being covered with porcelain or other highly-refractory substance. The upper surface of the reflector is provided with a series of metallic ribs H for the purpose of making a large heating-surface. To the upper surface of the reflector, in contact with the ring h h, I arrange a mica cone J, which is fastened at its upper surface to the lower portion of a ring K, the ring K being held in position by the legs k, extending to the ring A. To the ring K, I arrange the chimney N, to which I secure the crown L by means of brackets l. On the upper edge of the chimney N, I place the ring n, the chimney N and crown L being held firmly in position by the rods l', which are secured to the rings n and K. The dome M rests upon the ring A and is held in position by its upper edge being in contact with the asbestos ring m, which is secured to the crown L.

Between the chimney N and the crown L, I provide an opening through which the air passes downward, as indicated by arrows in Fig. 1, coming into contact with the mica cone and the upper ribbed surface H of the reflector G and passing downward through openings h in the upper edge of the reflector into the globe C, where it is brought in contact with the flame of the burner.

To the ring A, I arrange the tin guide-ring O for the purpose of directing the air in its downward course from the crown of the dome, as indicated by arrows in Fig. 1.

In Fig. 6 I show one means of securing the reflector G and the tin guides O to the ring A, as indicated, by means of the screw S, or it may be attached in any suitable manner.

For the purpose of conducting gas to the burner I arrange the pipe P within the rod B, connecting the same to a vertical coil P', extending within the mica cone J, and connect it at its lower end with the pipe F, to which the burner E is attached.

In operation the heat from the flame of the burner passes directly into contact with the reflector and with the vertical coil P'. The metallic ribs on the upper surface of the reflector are heated and the gas within the coil is raised to a high temperature.

By my construction I provide for the illuminating of the dome M, and in that way I obtain a more cheerful and pleasantly-lighted apartment. The construction of the lower chimney provides for allowing the light to pass to the dome and at the same time furnishes a light and serviceable chimney for the lamp, while the open coil P' permits the dispersion of the light without casting marked shadows.

What I claim as my invention, and desire to secure by Letters Patent, is—

1. In a lamp, the combination of a dome, a multiplicity of burners, a reflector-plate between said dome and said burners having corresponding apertures above said burners, a transparent chimney arranged above the apertures, a ring adapted to support the upper end of said chimney, braces adapted to support said ring, a secondary chimney resting upon said ring, said dome, apertures in the reflector-plate, and burners being so arranged that the dome is illuminated by direct rays from said burners through said apertures, substantially as described and for the purpose set forth.

2. In a lamp, a dome, a burner, an opaque reflector-plate intervening between said dome and burner and having an aperture above the burner, a transparent chimney erected above said aperture, an entering gas-pipe entering said chimney and depending therethrough and supported by said reflector-plate and carrying burners at its lower extremity, all suitably mounted and arranged, substantially as described and for the purpose set forth.

3. In a lamp, the combination of a lamp-ring, a globe hinged thereto, a burner within said globe, a reflector above said burner secured to said ring, a coil placed above said reflector, a cone-shaped lower chimney placed above said reflector, a ring placed around the upper edge of said lower chimney, an upper chimney connecting with said lower chimney, a dome around said lower chimney and upper chimney resting on said lamp-ring, a guide-ring O located contiguous to the ribs H H upon the upper surface of the reflecting-plate G, whereby the air drawn through the upper portion of the dome contiguous to the chimney N is caused to pass under the guide-ring O through the passage-ways between the ribs, and thence into the globe, substantially as described.

4. In a lamp, the combination of a lamp-ring, a lower globe hinged thereto, a burner within said globe, a reflector provided with a series of ribs, an opening in said reflector above each of the burners, a cone placed above said reflector, an upper chimney above said cone, a dome placed about said cone and upper chimney, a guide connected with said ring for the purpose of directing the current of air from the top of the dome in contact with the lower chimney and said ribs on said reflector, substantially as described and for the purpose set forth.

JAMES F. McELROY.

Witnesses:
  H. J. NODINE,
  C. S. HAWLEY.